Aug. 11, 1925.  B. E. SUTTON  1,549,161
INSECT TRAP
Filed March 28, 1922
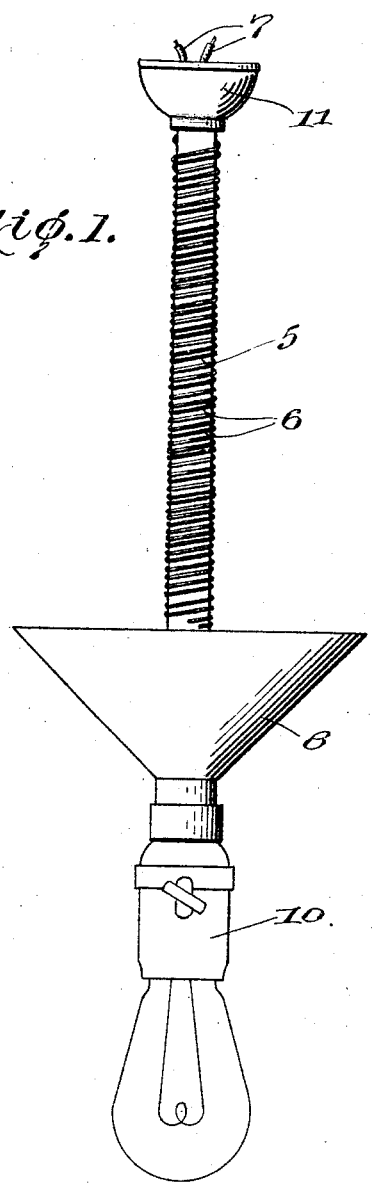
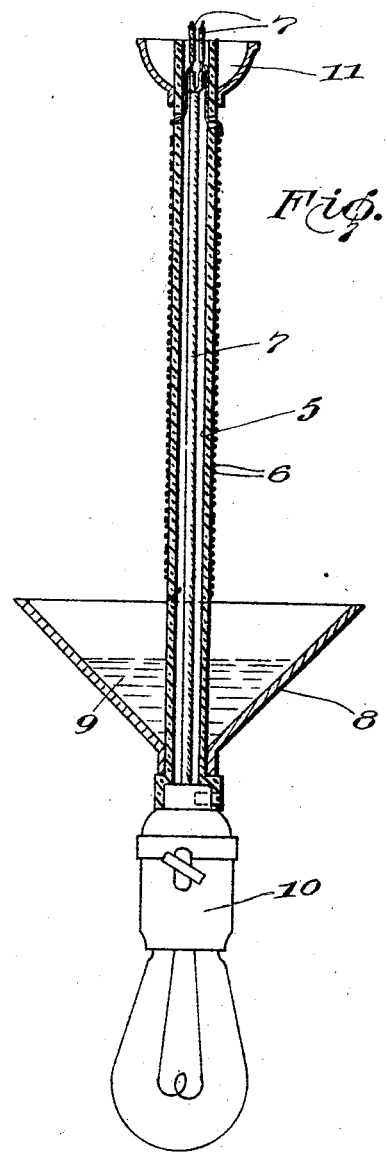
Inventor:
B. E. Sutton.
By Milo B. Stevens & Co.
Attorneys Patented Aug. 11, 1925.

1,549,161

UNITED STATES PATENT OFFICE.

BIRT E. SUTTON, OF BLUE RAPIDS, KANSAS.

INSECT TRAP.

Application filed March 28, 1922. Serial No. 547,477.

*To all whom it may concern:*

Be it known that I, BIRT E. SUTTON, a citizen of the United States, residing at Blue Rapids, in the county of Marshall and State of Kansas, have invented new and useful Improvements in Insect Traps, of which the following is a specification.

This invention relates to traps for flies and other insects which operate to destroy the insects by electrocution.

The invention has for its object to provide an electrocuting trap which is simple in construction and highly efficient in operation, and to this end it consists in a novel combination and arrangement of parts to be hereinafter described and claimed.

In order that the invention may be better understood, reference is had to the accompanying drawing, wherein:

Figure 1 is an elevation showing one embodiment of the invention; Fig. 2 is a similar view, partly in section.

Referring specifically to the drawing, 5 denotes a tube of insulating material which is adapted to be coated externally with some substance that acts to attract flies and other insects. Around the tube, on the outside thereof, are also helically wound two exposed conductors of electricity 6 which are connected at one end to supply wires 7, their other ends being left disconnected. The conductors 6 therefore form a normally open circuit, and the insects are electrocuted by closing this circuit. This action takes place when an insect comes in contact with two adjacent convolutions of the respective conductors 6, the current now passing through the insect. The convolutions of the two conductors 6 alternate, and they lie closely together to assure the action just described. The conductors 6 may be a pair of bare wires.

The lower end of the tube 5 carries a funnel shaped vessel 8 adapted to hold a liquid chemical substance, as shown at 9, which kills the insects dropping thereinto if they are not already killed when they come in contact with the conductors 6. If, upon coming in contact with the conductors 6, the insects are only stunned, they drop into the contents of the vessel 8, and are killed thereby.

To the lower end of the tube 5 may also be attached an ordinary lamp socket 10, the lamp wires being led down through the inside of the tube. These wires are also the supply wires 7 of the conductors 6, the connection being made at the upper end of the tube 5 inside a rosette 11 mounted on said end. The tube 5 can be suspended from a ceiling by means of a suitable fixture, so that the trap is a permanent installation and a part of the lighting fixture.

Figure 2 illustrates that the lower portion of the tube 5 is enlarged to form an annular shoulder and receptacle member 8 for the reception of the base of the socket 10 and to form a support for the lower portion of the funnel-shaped member 8.

I claim:

In a device of the kind described, a vertically disposed tube of insulating material provided on its lower end with an abruptly shouldered enlarged portion forming a receptacle for the base end of an incandescent lamp socket, an inverted frusto-conical liquid receptacle provided with a neck portion closely fitted on said tube and resting on the abruptly shouldered end, said tube having a pair of oppositely disposed openings adjacent its upper end but spaced therefrom, a two wire feed cable extending downwardly through said tube for attachment to a lamp socket and branch wires each extending from one of the wires of said cable of a respective opening at the top of the tube and spirally wound around said tube, one of said wires being wound between and in spaced relation to convolutions of the other wire.

In testimony whereof I affix my signature.

BIRT E. SUTTON.